Nov. 12, 1957
N. F. BROWN
2,812,717
SHOCK ABSORBER APPARATUS
Filed Nov. 9, 1953
2 Sheets-Sheet 1
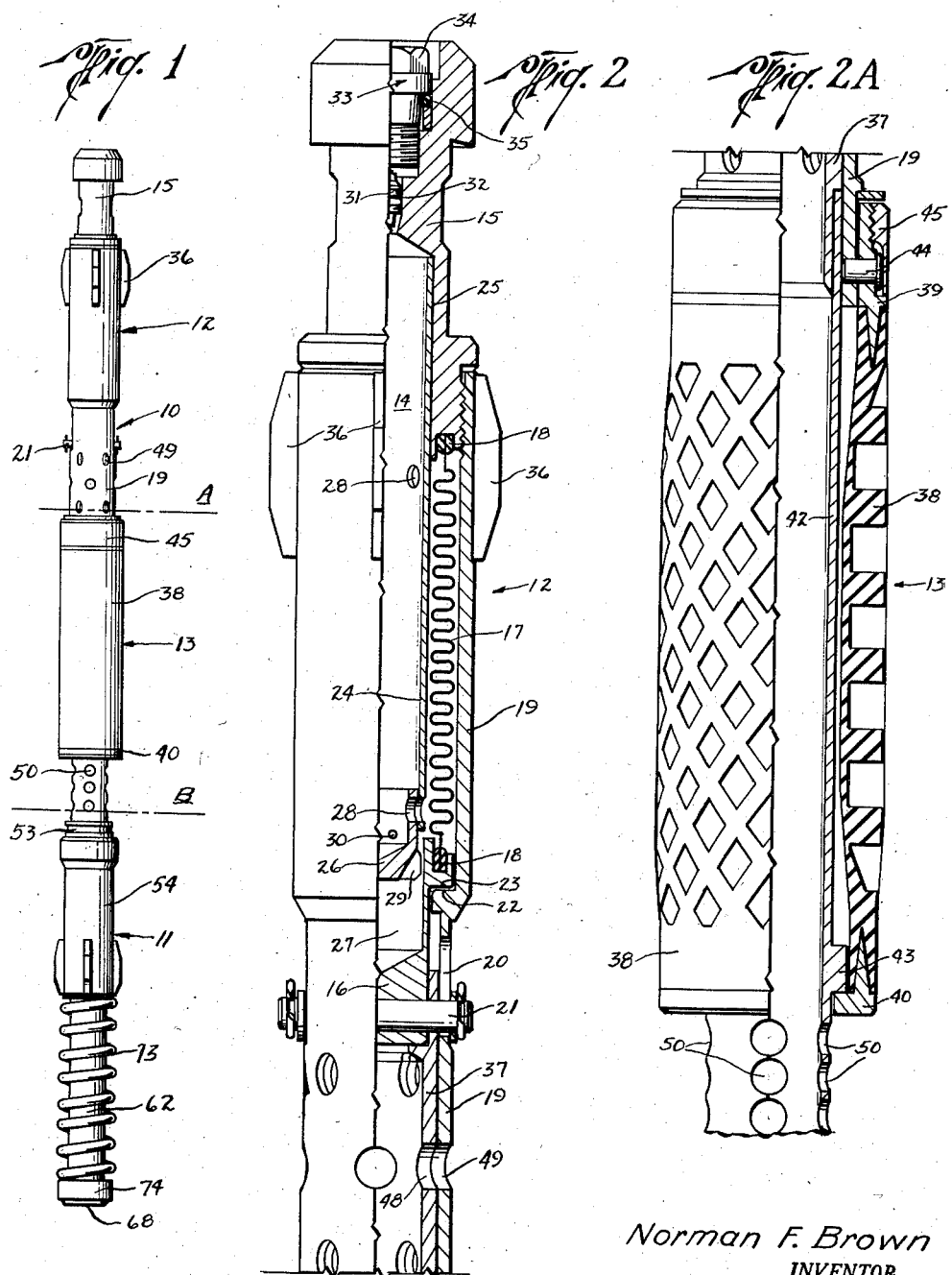
Norman F. Brown
INVENTOR.
BY Browning, Simms & Hyer
ATTORNEYS

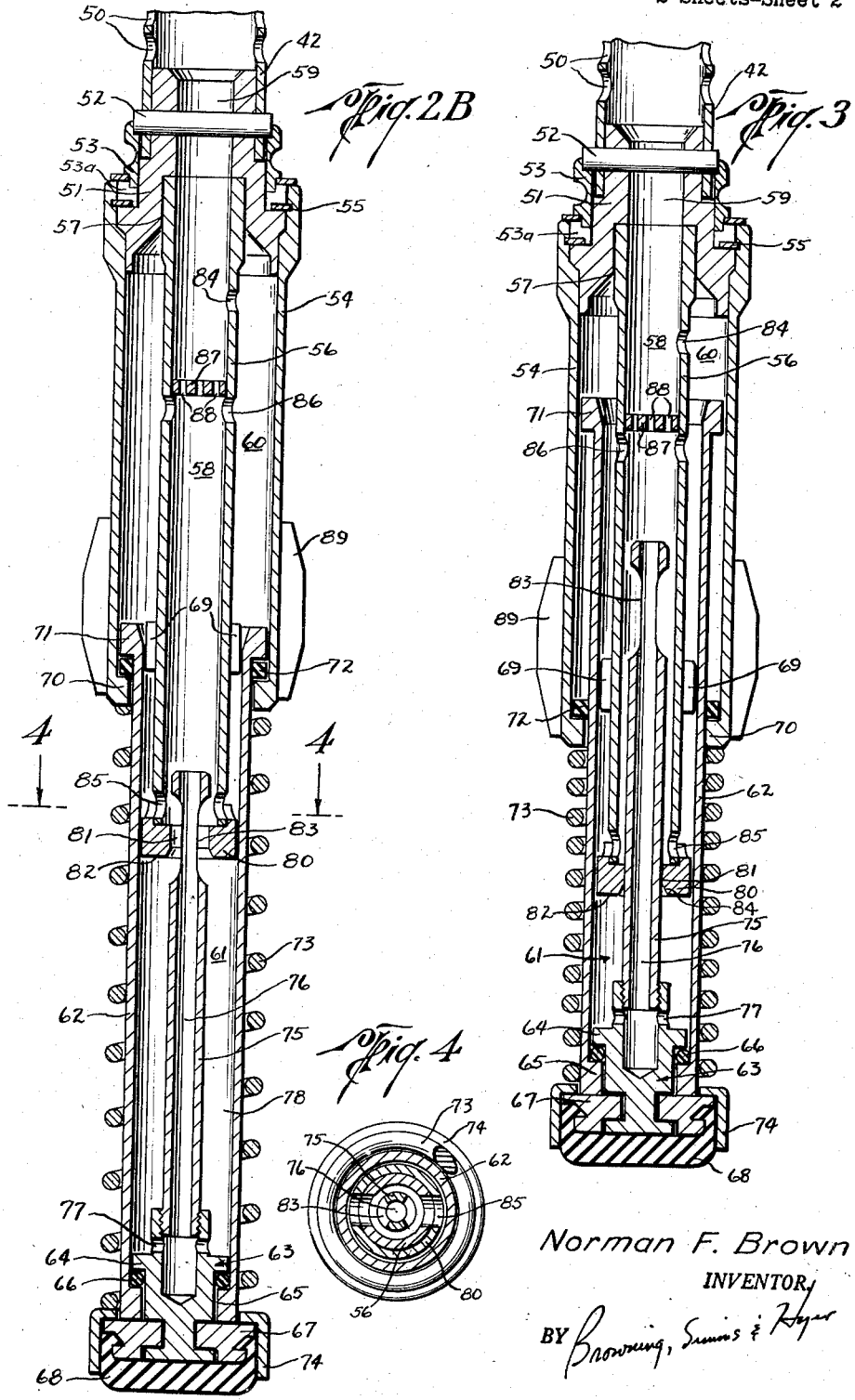

United States Patent Office 2,812,717
Patented Nov. 12, 1957

2,812,717

SHOCK ABSORBER APPARATUS

Norman F. Brown, Longview, Tex., assignor, by mesne assignments, to U. S. Industries, Inc., a corporation of Delaware Application November 9, 1953, Serial No. 391,030

15 Claims. (Cl. 103—52)

This invention relates to an improved hydraulic shock absorber of the restricted liquid flow type which is especially suitable for use at locations of varying ambient pressure. In one of its aspects, the invention relates to a shock absorber particularly adapted for landing a tool in a well bore.

In conventional shock absorbers of the restricted liquid flow or hydraulic type, a quantity of hydraulic fluid in a closed system is forced through a flow restriction for the purpose of dissipating impact energy to which the shock absorbers may be subjected. For this purpose, the fluid is forced from one closed chamber through the flow restriction and into another closed chamber by means of a piston which is actuated by application to it of the impact energy to be dissipated. In the usual construction, a piston rod is connected to the piston in order to transmit impact energy thereto. The piston rod extends into the chamber where the piston is situated through a sliding seal. The closed chambers are normally charged with hydraulic fluid at atmospheric pressure and where the shock absorber is employed at locations where the ambient pressure is likewise atmospheric, no great difficulties are encountered.

It has been found, however, that when shock absorbers of such construction are used at locations having either a high or a varying ambient pressure, it often occurs that the shock absorber is rendered inoperative. Thus, with the closed chambers charged at atmospheric pressure and the piston rod extending from a chamber through the sliding seal to be exposed to the high or varying ambient pressure, there is developed a net force on the piston tending to prematurely move it so as to collapse the shock absorber even before any impact energy is applied. In other words, the effective pressure differential applied to the piston moves it to force fluid from one chamber to another in the same manner as would the impact energy to be dissipated, and, as a result, later applied impact energy cannot be dissipated due to the premature collapse of the shock absorber.

Furthermore, charging of such a shock absorber with hydraulic fluid at an elevated pressure is not satisfactory because of the fact that even a very minute leak would quickly reduce the charge pressure and also because, in situations where a varying ambient pressure is encountered, the charge would have to be continually changed to meet the then existing ambient pressure. This is obviously unfeasible.

Another disadvantage of such type of shock absorber when used at high ambient pressures is that the seal with the piston rod, or other equivalent seal between the closed chambers and the ambient pressure, necessarily becomes quite stiff in action due to increase in friction between the seal and the part sealed against at high pressure differentials. This causes the action of the shock absorber to likewise become stiff so that the desired cushioning effect is decreased.

The problems encountered due to the lack of a suitable shock absorber have been particularly acute in the oil industry. Modern techniques for recovering the fluid through oil wells involve the dropping or lowering of various mechanisms to depths within the well bore. In order to position them at predetermined depths within the bore, these mechanisms are frequently moved vertically at relatively high speeds into engagement with a stop in the well. Such engagement, without suitable means for dissipating the impact energy developed, would in many cases result in damage to the mechanisms being lowered.

As an example, in the production of wells to recover oil from an underground reservoir, it is frequently found necessary to use an artificial gas lift for economical production. For this purpose, and as well known in the art, a gas is injected at a lower level in the well from the casing-tubing annulus into the tubing, or vice versa, so as to lift the oil upwardly through the tubing.

In conjunction with gas lift practices, there can be used a free piston of type disclosed in my Patent No. 2,555,112, or of the improved type disclosed herein and to be more particularly described hereinafter. This free piston is dropped downwardly through the well tubing until it is stopped by a stop part situated in the tubing at a predetermined depth.

Oil is accumulated above the piston by passing through a passage therein until the head of oil creates a predetermined pressure due to its hydrostatic head which actuates a mechanism of the free piston to close the passage and thereby form a plug in the tubing. Subsequent to the closing of the passage in the free piston, gas is injected into the tubing below the piston, whereby the piston and the slug of oil accumulated above it are forced upwardly to the surface. When the slug of oil has been removed from the well, the piston is dropped down the tubing to raise another slug of oil to the surface.

It has been proposed to attach a shock absorber of the type above discussed to an end of the free piston in order to cushion its impact with the stop in the well tubing. However, due to the problems caused by the high, and frequently varying, ambient pressure within the tubing, which may be many times that of atmospheric, shock absorbers of such type have been found to be in need of improvement in order to effect their desired function in the most efficient manner under the conditions found in a well. Further, other conditions and problems, made more apparent below, have prevented prior art shock absorbers from being as satisfactory as those embodying the instant invention and this is particularly true in the circumstances encountered in well operations.

Therefore, for purposes of illustration, a shock absorber embodying this invention and which provides such improvements has been shown in connection with an improved type of free piston for use in a well. Of course, many other advantageous uses of the improved shock absorber of this invention are also contemplated and, for this reason, one of the broader objects of this invention is to provide a hydraulic shock absorber of the restricted liquid flow type which is especially well suited for use at locations of relatively high or varying ambient pressure.

It is a more particular object of this invention to provide an improved hydraulic shock absorber of the restricted flow type for use in cushioning the vertical movement of a tool within a well.

Another object of this invention is to provide a shock absorber of the restricted liquid flow type in which the tendency for the absorber to prematurely collapse due to a pressure differential between liquid within the absorber and fluid ambient of the absorber, is eliminated by impressing such ambient pressure on such liquid whereby a net force tending to move liquid through its restricted flow passage is not developed except upon the application of impact energy to the absorber.

Another object of this invention is to provide a shock absorber of the restricted liquid flow type which is adapted to employ a well liquid as the hydraulic medium, such medium being automatically supplied to the absorber upon immersion in a body of the liquid within a well.

Still another object of this invention is to provide a shock absorber of the restricted liquid flow type which obviates the necessity of a fluid tight seal between a variable volume chamber and a piston or other movable means employed to force liquid from or into such chamber through a flow restriction to dissipate energy whereby any tendency for a seal to reduce the efficiency of the absorber is eliminated.

Another object of this invention is to provide a shock absorber of the restricted liquid flow type having a displacement chamber therein which is automatically and substantially completely re-filled with liquid derived from a well bore even though such liquid may be gas laden and tend to form a gas pocket in the displacement chamber upon actuation of the shock absorber.

Another object of this invention is to provide a shock absorber of the restricted liquid flow type in which the displacement chambers thereof are in fluid communication with the exterior of said shock absorber such that a differential in pressure cannot exist across the restricted flow passageway connecting the chambers except when impact energy is being dissipated whereby a change in pressure ambient of the shock absorber does not cause displacement of liquid from one of such chambers to the other.

Another object of this invention is to provide a shock absorber for use in a well containing a liquid which is adapted to receive liquid from the well and expel a quantity of liquid back into the well upon actuation thereof so that sand or other debris in the well liquid does not accumulate in the absorber.

Still another object of this invention is to provide a shock absorber of the restricted liquid flow type and having a hydraulic liquid reservoir of sufficient capacity to provide for plural re-filling of the displacement chamber of the shock absorber without the addition of hydraulic liquid from an external source.

Still another object of this invention is to provide a shock absorber of the restricted liquid flow type in which the components are so arranged that it is not necessary to provide a sliding seal between moving parts thereof and in which considerable wear can be tolerated between such moving parts without any substantial lessening of efficiency of the absorber.

Still another object of this invention is to provide a shock absorber of the restricted liquid flow type and having a hydraulic fluid reservoir, a displacement chamber, and a flow restriction, all arranged so as to permit settling of any heavier fluids into position to be first displaced from said chamber upon actuation of the shock absorber.

A still further object of this invention is to provide an improved shock absorber construction in which a displacement chamber is provided with a port in such a position that such chamber will be rapidly filled with fluid from a reservoir prior to actuation of the shock absorber, the reservoir being open for filling with liquid into which the shock absorber may be immersed.

Other objects, advantages and features of this invention will be more apparent to one skilled in the art upon a consideration of the specification, claims and drawings of this application wherein there is illustrated and described a preferred embodiment of this invention.

In the drawings, wherein like numerals are employed throughout to designate like parts:

Fig. 1 is an over-all assembly view of a shock absorber embodying this invention and attached to an improved type of free piston adapted to be moved vertically within a well;

Fig. 2 is an enlarged view, partly in section, of the upper portion of the free piston shown above the line A of Fig. 1;

Fig. 2A is an enlarged view, partly in section, of the lower portion of the free piston shown between the lines A and B of Fig. 1;

Fig. 2B is an enlarged sectional view of the shock absorber of this invention as shown below the line B of Fig. 1;

Fig. 3 is a view similar to Fig. 2B but in which the shock absorber has been actuated; and Fig. 4 is a cross-sectional view of the shock absorber, taken along the line 4—4 of Fig. 2B.

Referring now particularly to the drawings, the assembly of Fig. 1 includes a free piston, designated in its entirety by the numeral 10, having a preferred embodiment of the novel shock absorber 11 attached thereto. The free piston 10 includes a bellows portion 12, shown in detail in Fig. 2, and a packer assembly 13, shown in detail in Fig. 2A.

The upper bellows portion 12 of the free piston includes a charge pressure chamber or dome 14 enclosed by upper and lower head members 15 and 16, respectively, and an extensible metal bellows 17 sealingly secured at its upper and lower edges, as by soldering, etc., at 18 in recessed portions of the head members. An outer sleeve 19 is carried by head member 15 to surround bellows 17 and is mounted for sliding longitudinal movement relative to head member 16 but limited as to rotation relative thereto by means of a slot 20 which receives guide pin 21 extending through the lower head member. Thus, as can be seen from Fig. 2, upon an increase in pressure exterior of the bellows to a value in excess of that in dome 14, upper head member 15 will move downwardly with resultant decrease in volume of dome 14. However, assuming a drop in the exterior pressure so that the pressure in dome 14 becomes greater than the exterior pressure, the bellows will be extended such that a shoulder 22 on outer sleeve 19 will engage an abutment 23 on lower head member 16.

A guide liner 24 is affixed at its upper end, as at 25, to head member 15 and is provided at its lower end with a guide part 26 which slides within bore 27 in lower head member 16. Part 26 and liner 24 are both preferably of a maximum external diameter such as to provide a sliding fit in bore 27. One or more ports, such as at 28, through liner 24 and guide member 26, in combination with slots 29, provide communication between the interior of liner 24 and the exterior thereof including bore 27 thereby permitting free flow of charge fluid within the bellows. As well, guide member 26 is provided with one or more ports 30 through a reduced diameter portion thereof so that upon entry of liner 24 into bore 27, the fluid beneath guide 26 will be free to flow out of the bore and into the liner. If desired, ports 30 can be of such size as to provide a cushioning effect upon retraction of the bellows so as to extend liner 24 into bore 27.

A one way valve 31 is received in a passage 32 through upper head member 15 to permit charging pressure dome 14 with a resilient fluid. The head member is plugged above valve 31 by plug 33, the head 34 of which seats upon a seal 35. Guide fins 36 of a suitable size to fit the well tubing are provided circumferentially of sleeve 19.

As best shown in Figs. 2 and 2A, packer assembly 13 is connected to upper bellows portion 12 by outer sleeve 19 and by an inner sleeve 37 which is pinned at its upper end to lower head member 16.

A sleeve-like packer 38 of rubber or other resilient, deformable material is carried at its upper and lower ends by molded-in collars 39 and 40, respectively. This packer 38 is molded so that it expands to normally assume a barrel shape when free from endwise forces. When so expanded, the diameter of its central portion is such that it will engage the inner surface of the well tubing and form a sliding seal therewith.

However, when tensioned lengthwise, the packer is collapsed radially to assume a substantially cylindrical shape wherein the diameter at the central portion is smaller than the inside diameter of the tubing. Of course, upon release of the tensioning forces, the natural tendency of the packer will be to reassume its barrel shape.

In order to provide for expansion and contraction of packer 38, its opposite ends are connected to sleeves 37 and 19 whereby extension and contraction of the bellows effects a contraction and expansion of the packer. Thus, extension casing 42 of sleeve 37 provides a shoulder 43 for engaging collar 40 while collar 39 is provided with pins 44 connecting it to sleeve 19. Cap 45 maintains pins 44 in position.

In this manner, packer 38 is held in spaced relation to extension casing 42 in its tensioned or collapsed position, as shown in the drawings, as well as in its expanded position. It can now readily be seen that as outer sleeve 19 is moved relative to lower head member 16 and inner sleeve 37 upon retraction of bellows 17, it will also slide relative to casing 42 to move the upper collar 39 along casing 42 toward collar 40 and thus permit packer 38 to expand into its barrel shape and into engagement with the well tubing.

While well liquids to a certain extent can flow upwardly past packer 38, when it is collapsed, to accumulate a slug of liquid above the free piston, it is preferred to also provide an inner flow-way in the piston past the packer and to close this flow-way when the desired head of liquid has accumulated above the piston. Thus, adjacent portions of the inner and outer sleeves 37 and 19 are respectively provided with ports 48 and 49 which, upon relative movement of the sleeves, act as a valve to control flow between the interior of casing 42 and the exterior of the free piston, i. e., with the well tubing above packer 38. Ports 50 are also provided in casing 42 below packer 38 to permit flow from the tubing to enter casing 42 and then flow out through ports 48 and 49.

Viewing now the over-all operation of the free piston 10 in the light of the foregoing description, the pressure dome 14 is initially charged with a resilient fluid through valve 31 to the desired pressure prior to dropping the free piston into the well tubing. This pressure will extend the bellows 17 and cause the outer sleeve 19 to move along lower head member 16 to engage shoulder 22 with abutment 23. The resulting positioning of sleeves 19 and 37 brings ports 48 and 49 into register whereby fluid flow is permitted through ports 50, casing 42 and then out ports 48 and 49 into the tubing above the free piston. The upward movement of sleeve 19 also carries collar 39 with it to collapse packer 38 causing it to assume its substantially cylindrical shape.

In this manner, piston 10 is made free to drop down the well tubing, permitting gas or other fluid beneath it to flow above it until shock absorber 11 engages a stop means (not shown) suitably positioned at the desired depth within the tubing.

Oil within the tubing will pass through and around the free piston and accumulate thereabove until, as previously mentioned, the head of the oil above the piston is sufficient to retract bellows 17 and cause outer sleeve 19 to slide downwardly relative to lower head member 16. When this happens, the flow passage through the ports 48 and 49 is closed and the packer 38 is expanded into sealing engagement with the well tubing. As a result, free piston 10 traps a slug of the oil above it and, as previously mentioned, lifting gas can be injected into the tubing below the free piston to cause it to be raised within the tubing and to thereby lift the trapped oil slug to the surface of the well.

Turning now to a detailed description of the preferred embodiment of the shock absorber of this invention, Fig. 2B shows the shock absorber ready for actuation, while Fig. 3 shows it being actuated.

To connect the shock absorber to the free piston described above, a head member 51 of the shock absorber and the lower end of casing 42 of packer assembly 13 are provided with matched openings to receive a locking pin 52. Pin 52 is secured by a sleeve 53 which is maintained in securing position by a snap retaining ring 53a.

In accordance with one feature of this invention, a liquid reservoir is provided to receive well liquids therein and to retain such liquids for use by the shock absorber. To provide this reservoir, a downwardly extending outer tubular member 54 is secured to head member 51 by a snap retaining ring 55. A concentrically arranged inner tubular part 56 is fixed in a counter bored portion 57 of the head member 51. Thus, the reservoir mentioned above can be said to be divided into an inner fluid reservoir 58 within the tubular member 56 which communicates with casing 42 through an opening 59 in head member 51, and an outer reservoir 60 in the annular space between the tubular members 54 and 56.

A displacement chamber 61 from which liquid is forced to dissipate impact energy is formed within a housing or cylinder 62 having the lower end thereof closed, as shown, by a fitting 63. The latter has an annular flange 64 opposing an inturned shoulder 65 of cylinder 62 and sealed therewith by means of seal 66. Fitting 63 is recessed toward its lower end to receive a base member 67 for retaining a rubber bumper 68. If desired, the bumper may comprise instead a metal bumper, or a compression coil spring or the like. Its purpose is to reduce the force of impact of the unsprung cylinder 62 with the stop part in the well.

The upper open end of the cylinder 62 telescopes into reservoir 60 and is guided in its movement by guides 69 on inner tubular member 56 and an inturned annular shoulder 70 at the lower end of outer tubular member 54. The downward movement of the cylinder 62 is limited by the engagement of an annular flange 71 on the upper end of the cylinder with a buffer ring 72 resting on shoulder 70. The outer circumference of flange 71 also acts as a guide for the cylinder during its movement along the inner surface of tubular member 54.

To assure that cylinder 62 will be returned from its Fig. 3 to its Fig. 2B position after impact, resilient means are provided to urge the cylinder to an extended position. Such means can comprise a compression coil spring 73 surrounding the cylinder and compressed between flange 70 and a sleeve retainer 74 resting on base 67. Upon bumper 68 striking a stop, the spring will be compressed as shown in Fig. 3 whereby after dissipation of impact energy by the shock absorber, as will be more fully explained hereinafter, the shock absorber will be moved from its Fig. 3 to the Fig. 2B position. For this purpose, spring 73 is preferably strong enough to lift the weight of the tool connected to the shock absorber as well as that of the parts of the shock absorber which move with the tool during shock absorption. With the spring of such strength, the shock absorber will be in extended position while the free piston is accumulating liquid thereabove and while the shock absorber immersed in liquid which assures that the reservoir and chamber 61 will be filled to a maximum level before the shock absorber and free piston start upwardly in the well.

Arranged within and extending parallel of the axis of cylinder 62 is a smaller cylinder or tubular part 75 which is supported by fitting 63 and opens out into reservoir 58 and thence through ports 50 to the exterior of the shock absorber. Passage 76 in cylinder 75 forms part of a means for providing fluid communication between the exterior of the shock absorber and chamber 61 so that the latter is impressed with pressure exterior or ambient of the shock absorber thereby preventing premature collapse of the absorber due to high ambient pressures. As a part of such means, restricted flow passageways 77 are provided to communicate between chamber 61 and passage 76. Such passageways also function to dissipate impact energy by creating a high pressure drop between chamber 61 and passage 76. Of course, the number and size of the passageways 77 is selected so that all the kinetic energy of the falling mass (principally that of the tool) is at such a rate of deceleration that (a) all parts of any mechanism of the tool to be protected are safe, (b) the permissible stroke of the shock absorber is adequate for the highest travelling velocities likely to be met within the conditions for which the unit is being used and (c) equally satisfactory results are obtained despite changes in the consistency of the liquid flowing through the passageways.

In order to force liquid from displacement chamber 61 through restricted passageways 77, means are provided to be moved relative to cylinder 62 to vary the volume of the displacement chamber responsive to the application of impact energy to the shock absorber. Thus, the lower end of inner tubular member 56 is provided with a piston 80 having an opening 81 centrally thereof and adapted to be guidably movable vertically along small cylinder 75. The piston has a working surface 82 of an area approximately corresponding to that of the annular space 78. In this respect, as will be explained hereinafter, the slidable engagement of the piston 80 over the cylinder 75 and with the inner diameter of the cylinder 62 need not necessarily be fluid tight.

The small cylinder 75 is provided near its upper end with one or more ports 83 which extend in either direction beyond the piston, when the shock absorber is in its Fig. 2B position, and are of a size sufficient to permit liquid to flow from the reservoir 58 quickly and directly into displacement chamber 61 when the piston is disposed in the Fig. 2B position and also to permit any gas in the displacement chamber to flow upwardly into reservoir 58. The piston 80, in sliding downwardly along the ports 83, is guided by the walls of cylinder 75 lying to either side of the ports. Opening 81 in the piston may be flared as at 84 to facilitate movement of the piston past the ports.

The operation of the shock absorber and certain of the advantages of this invention and the problems overcome will be apparent from the above description of the apparatus. That is, upon impact of bumper 68 with a stop, spring 73 will be compressed and cylinder 62 moved upwardly relative to the tubular members 54 and 56. Thus, with liquid disposed within displacement chamber 61 to a depth at least to the lower level of ports 83, piston 80 will act to force the liquid from annular space 78 through restricted passageways 77 and into passage 76, thereby dissipating the energy applied to the shock absorber. It will be noted, however, that displacement chamber 61 is impressed at all times with the pressure ambient of the shock absorber through the reservoir 58 and ports 50. Therefore, assuming the shock absorber 11 to be exposed to a relatively high pressure, there will be no danger of the displacement chamber being prematurely collapsed, as is frequently the case with conventional shock absorbers.

It will also be noted that restricted passageways 77 are situated adjacent the lower end of the displacement chamber. This permits the settling down to these passageways of heavier foreign matter (e. g., sand or the like) within the liquid in the displacement chamber. Then, when the liquid is forced through restrictions 77, it will actively jet the accumulated foreign matter from the displacement chamber and into reservoir 58. Most of this ejected fluid will flow through the reservoir and out through ports 50 thereby actually removing foreign matter from the interior of the shock absorber itself.

Still further, when cylinder 62 is returned, after actuation of the shock absorber, to its normal position as in Fig. 2B with the ports 83 overlapping opening 81 of piston 80, fluid from reservoir 58 will quickly refill displacement chamber 61 and permit repeated operation of the shock absorber. This construction has been found very advantageous where the shock absorber is used in wells because the well fluid (oil) is usually saturated with gases which are released upon any substantial reduction in the pressure exerted on the oil. Thus, when spring 73 moves piston 80 upwardly, the pressure in chamber 61 is reduced so that by the time the piston has reached its Fig. 2B position, considerable free gas may exist in the chamber. Since this gas will dissipate only a negligible amount of energy when flowing through passageways 77, it is undesirable. It is, in this construction, released from the displacement chamber for upward flow through reservoir 58 via ports 83.

It will also be appreciated that the ports 50, which are preferably situated above the reservoirs 60 and 58, permit these reservoirs to fill with liquid from the well in which the shock absorber may be disposed. Thus, they automatically provide a renewable source of hydraulic fluid from the well for use in the displacement chamber. This, of course, renders the shock absorber of this invention particularly well suited for use in a well.

Communication between the inner reservoir 58 and outer reservoir 60 is provided through ports 84 and 86 in the walls of the inner tubular member 56 toward the upper end thereof and ports 85 adjacent the piston 80. Thus, well liquid can pass through opening 59 and ports 84 into reservoir 60 to provide a supply of hydraulic fluid for the shock absorber which is considerably in excess of any expelled through ports 50 when the absorber is actuated. Also, inasmuch as ports 85 are located adjacent the piston 80 and opening 81 therethrough, not only will the displacement chamber 61 be quickly filled with liquid from reservoir 60 but also foreign matter within the reservoir will tend to settle out and pass into the displacement chamber whereby it can be displaced through flow restrictions 77, in a manner previously described. Further, since tubular member 56 more or less confines the jetted liquid emerging from tube 75 to be within reservoir 58, the liquid in reservoir 60 is not excessively stirred and this helps prevent frothing of liquid therein.

It will be further noted that a sliding seal need not be provided between cylinder 62 and outer tubular member 54 or between piston 80 and either of cylinder 62 or tubular part 75. That is, since the reservoir and displacement chamber can be refilled merely by submersion in the well liquid, leakage therefrom becomes non-critical. Also, any leakage past piston 83 during its operation which is not so excessive that flow from the displacement chamber becomes insufficiently restricted to dissipate the impressed impact energy, is unimportant since such leakage is merely in the reservoir into which the liquid from passageways 77 flows. Accordingly, the piston can have a relatively loose sliding fit (e. g., 0.005 inch clearance) with cylinder 62 and tubular part 75 and can be subjected to considerable wear without substantially decreasing the efficiency of the shock absorber. The same is true of the fit between shoulder 71 of cylinder 62 and tubular part 54. Any leakage between such parts while the shock absorber is in its Fig. 2B position is limited by buffer 72. The shock absorber is in its Fig. 3 position only during the short time when it is absorbing a shock at which time leakage from the reservoir is no longer of any consequence at all. Also, the Fig. 3 position usually occurs while the shock absorber is immersed in liquid so leakage is immaterial.

It is contemplated that, if desired, a port (not shown) can be located in outer tubular member 54 adjacent the upper end of reservoir 60 to provide direct communication between such reservoir and the well fluid exteriorly of the shock absorber. This would permit entry of well liquid into the reservoir should the ports 50 be closed.

A baffle 87 can be disposed across the passage through reservoir 58 for controlling the amount of liquid which is expelled from the shock absorber upon actuation thereof. That is, upon displacement of liquid from the chamber 61 into the reservoir 58, a certain amount of control of the fluid jetted through the ports 50 could be exercised by the proper selection of openings 88 through the baffle. The remainder of the fluid would be retained within reservoir 58 or diverted to reservoir 60 through adjacent ports 86.

The outer tubular member 54 may also be provided with guide fins 89, similar to guides 36, for centering the shock absorber within the well tubing and in spaced relation thereto to permit easy passage of well fluid to the free piston 10.

It will be appreciated that if the shock absorber of this invention be used within a well, liquid from the well will supply a constant and renewable source of hydraulic medium to the reservoirs of the shock absorber, even though it is contemplated that upon actuation of the shock absorber a certain amount of the hydraulic liquid will be jetted from passage 76 outwardly through the ports 50. Also, when well liquid is temporarily not readily available as a source of hydraulic medium, reservoir 60 in combination with reservoir 58 will provide a source sufficient to permit repeated operation of the shock absorber, especially since baffle 87 serves to retain a large portion of said source.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a well apparatus wherein a tool is dropped down a well and is interrupted in its fall by a stop part situated at a predetermined depth in the well, the combination of a tool; a shock absorber of the restricted liquid flow type having a housing including a chamber, fluid passage means including a constantaly open restricted flow passageway providing communication between the interior and exterior of said chamber, means including a part movable relative to the chamber to vary the volume of the chamber and to move liquid through said restricted passageway responsive to the application of impact energy to said movable means, resilient means urging said movable movable means in one direction relative to the chamber, one of said housing and said movable means being connected to said tool and the other having a portion engageable with a stop part in a well, and means independent of relative movement of said housing and movable means providing impression of fluid pressure exteriorly of said shock absorber upon the liquid in said chamber intermediate said part and restricted passageway whereby a change in fluid pressure exteriorly of the shock absorber tending to move the movable means and chamber relative to each other is balanced by the application of a substantially equal pressure on the liquid in said chamber thereby preventing such relative movement.

2. In a well apparatus wherein a tool is dropped down a well and is interrupted in its fall by a stop part situated at a predetermined depth in the well, the combination comprising a tool, a shock absorber of the restricted liquid flow type having a housing including a chamber, means including a constantly open restricted flow passageway providing communication between the interior and exterior of said chamber, means including a part movable relative to the chamber to vary the volume of the chamber and move liquid through said restricted passageway, resilient means urging said part in one direction relative to said chamber, one of said housing and said movable means being connected to said tool and the other having a portion engageable with a stop part in a well, and a fluid passageway providing communication between the exterior of the shock absorber and said restricted passageway whereby a change in pressure externally of the shock absorber is transmitted via the restricted passageway to the fluid inside said chamber.

3. In a well apparatus wherein a tool is dropped down a well and is interrupted in its fall by a stop part situated at a predetermined depth in the well, the combination comprising a tool, a shock absorber of the restricted liquid flow type and having a housing including a chamber, means movable in the chamber to vary the volume thereof, a restricted passageway for conducting liquid flow between the interior and exterior of the chamber upon movement of said movable means between first and second positions in the chamber, one of said housing and movable means being connected to the tool and the other adapted for engagement with a stop part in a well whereby upon such engagement, said movable means is moved from its first to its second position by the momentum of the falling tool to force liquid through said restricted passageway, resilient means urging said movable means toward its first position, and a port adjacent the upper end of said chamber and providing communication between the interior of the chamber and exterior of the shock absorber with the movable means in its first position thereby releasing any gaseous fluid from said chamber and permitting it to fill with well liquids, said movable means including a part movable to block flow through said port into and out of the interior of said chamber responsive to movement of said movable means from said first towards said second position.

4. The apparatus of claim 3 in combination with resilient means urging said movable means to its first position, the resilient means being of sufficient strength to lift the tool after the impact energy thereof has been dissipated by the shock absorber whereby said chamber is filled with a well liquid while the shock absorber is engaged with said stop part.

5. In a well apparatus wherein a tool is dropped down a well and is interrupted in its fall by a stop part situated at a predetermined depth in the well, the combination comprising a tool, a shock absorber of the restricted liquid flow type comprising a housing including a chamber, means movable in the chamber to vary the volume thereof, a restricted passageway for conducting liquid between the interior and exterior of the chamber upon movement of said movable means between first and second positions in the chamber, one of said housing and movable means being connected to said tool and the other adapted for engagement with a stop part in a well whereby upon such engagement, said movable means is moved from its first to its second position by the momentum of the falling tool to force liquid through said restricted passageway, and a liquid reservoir having fluid communication with said chamber at least while said movable means is in its first position to assure said chamber is liquid full before said movable means moves from its first to its second position, a port placing said reservoir in fluid communication with the exterior of the shock absorber, said port being larger than said restricted passageway and being of sufficient size that well liquids can readily flow therethrough into said reservoir so as to refill the reservoir upon submergence in well liquids in the well.

6. The apparatus of claim 5 wherein a port is provided adjacent the upper end of said chamber placing the interior of the chamber and the exterior of the shock absorber in fluid communication when the movable means is in its first position thereby releasing any gaseous fluid from said chamber and permitting it to fill with well liquids, said movable means including a part movable to close the last mentioned port upon predetermined movement of said movable means away from said first toward said second position.

7. The apparatus of claim 6 wherein said restricted passageway is carried by the housing adjacent the lower end of said chamber so as to permit washing sand or the like from the chamber upon liquid flow through said restricted passageway.

8. A shock absorber for use in a well and hydraulically operable through the medium of a liquid contained in said well, said shock absorber comprising a chamber for containing said liquid, a restricted passageway in a wall of said chamber for restricting the flow of liquid therefrom, means for communicating said chamber with said well for receiving liquid therefrom, said communicating means being of larger flow capacity than said restricted passageway and also being of sufficient size as to freely permit flow of well liquid into said chamber while permitting flow of gases therefrom, and piston means for forcing liquid through said restricted passageway.

9. A hydraulic shock absorber for use with a tool to be moved within a well and operable to cushion said tool upon impact with a stop means at a depth within said well, said shock absorber comprising, in combination, a cylinder forming a displacement chamber, piston means movable in said cylinder to vary the volume of said chamber, a reservoir above said cylinder and open to the exterior of the shock absorber to receive well liquids therein, a restricted flow passageway from said chamber and communicating with said reservoir, and a port near the upper end of the chamber and communicating with the exterior of the shock absorber to permit gases to flow from said chamber, said port being closed by movement of said piston means into said chamber.

10. The apparatus of claim 9 wherein said port communicates with the exterior of the shock absorber through said reservoir.

11. The apparatus of claim 10 wherein said restricted passageway is situated near the lower end of said chamber so that sand or the like settling in said chamber is washed therefrom by liquid flowing through the restricted passageway.

12. The apparatus of claim 11 in combination with means dividing said reservoir into first and second portions, said restricted passageway being situated to direct at least a portion of the liquid flowing therethrough into said first reservoir portion, and a port between the second and first reservoir portions to permit liquid flow therebetween.

13. The apparatus of claim 12 wherein the last mentioned port is situated near the bottom of the second reservoir portion and adjacent the port near the upper end of the chamber whereby sand or the like from the second reservoir portion can flow into said chamber to be washed therefrom through said restricted passageway.

14. The apparatus of claim 13 in combination with a baffle in said first reservoir portion partially interrupting flow therethrough from said restricted passageway, and a fluid passageway communicating between the first and second reservoir portions and having an inlet situated intermediate the baffle and said restricted passageway whereby a part of the flow interrupted by said baffle is diverted into said second reservoir portion.

15. In a well apparatus wherein a tool is dropped down a well and is interrupted in its fall by a stop part situated at a predetermined depth in the well, the combination comprising a tool, a shock absorber of the restricted liquid flow type comprising a housing including a chamber, means movable in the chamber to vary the volume thereof, a restricted passageway for conducting liquid flow between the interior and exterior of the chamber upon movement of said movable means between first and second positions in the chamber, one of said housing and movable means being connected to the tool and the other adapted for engagement with a stop part in a well whereby upon such engagement, said movable means is moved from its first to its second position by the momentum of the falling tool to force liquid through said restricted passageway, and a port adjacent the upper end of said chamber and providing communication independently of said restricted passageway between the interior of the chamber and exterior of the shock absorber with the movable means in its first position thereby releasing any gaseous fluid from said chamber and permitting it to fill with well liquids, said port being in position to be closed by said movable means upon relative movement between said movable means and said housing and prior to said movable means reaching its second position.

References Cited in the file of this patent

UNITED STATES PATENTS

| | | |
|---|---|---|
| 1,178,996 | Duffing | Apr. 11, 1916 |
| 1,792,695 | Lewis | Feb. 17, 1931 |
| 2,323,321 | Futral | July 6, 1943 |
| 2,390,300 | Harris | Dec. 4, 1945 |
| 2,482,114 | Nixon | Sept. 20, 1949 |
| 2,704,980 | Vincent | Mar. 29, 1955 |
| 2,714,855 | Brown | Aug. 9, 1955 |

FOREIGN PATENTS

| | | |
|---|---|---|
| 822,278 | France | Sept. 13, 1937 |